US006466618B1

(12) United States Patent
Messing et al.

(10) Patent No.: US 6,466,618 B1
(45) Date of Patent: Oct. 15, 2002

(54) RESOLUTION IMPROVEMENT FOR MULTIPLE IMAGES

(75) Inventors: Dean Messing, Camas, WA (US); Muhammed Ibrahim Sezan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/448,069

(22) Filed: Nov. 23, 1999

Related U.S. Application Data

(60) Provisional application No. 60/166,552, filed on Nov. 19, 1999.

(51) Int. Cl.$^7$ ................................................ H04N 7/18
(52) U.S. Cl. ........................ 375/240.01; 348/42; 348/43
(58) Field of Search ................. 348/42–60; 375/240.08, 375/240.12–240.16, 240.25–240.29

(56) References Cited

U.S. PATENT DOCUMENTS

| | | | |
|---|---|---|---|
| 4,127,873 A | 11/1978 | Katagi | |
| 4,517,599 A | 5/1985 | Zwirn et al. | |
| 4,760,469 A | 7/1988 | Biber et al. | |
| 5,231,502 A | 7/1993 | Pfister | |
| 5,231,519 A | 7/1993 | Koike | |
| 5,341,174 A | 8/1994 | Xue et al. | |
| 5,374,963 A | 12/1994 | Willis | |
| 5,422,718 A | 6/1995 | Anderson | |
| 5,442,394 A | 8/1995 | Lee | |
| 5,465,157 A | 11/1995 | Seto et al. | |
| 5,469,274 A | 11/1995 | Iwaski et al. | |
| 5,521,037 A | 5/1996 | Nagase et al. | |
| 5,532,548 A | 7/1996 | Spindt et al. | |
| 5,550,935 A | 8/1996 | Erdem et al. | |
| 5,579,054 A | 11/1996 | Sezan et al. | |
| 5,579,445 A | 11/1996 | Loce et al. | |
| 5,579,451 A | 11/1996 | Suzuki | |
| 5,657,402 A | 8/1997 | Bender et al. | |
| 5,696,848 A | 12/1997 | Patti et al. | |
| 5,767,987 A | 6/1998 | Wolff et al. | |
| 5,790,764 A | 8/1998 | Suzuki | |
| 5,880,767 A | 3/1999 | Liu | |
| 5,920,657 A | 7/1999 | Bender et al. | |
| 6,205,260 B1 | 3/2001 | Crinon et al. | |
| 6,269,175 B1 * | 7/2001 | Hanna et al. | ................ 382/107 |
| 6,292,218 B1 * | 9/2001 | Parulski et al. | ............. 348/220 |
| 6,330,029 B1 * | 12/2001 | Hamilton et al. | ............ 348/272 |
| 6,343,146 B1 * | 1/2002 | Tsuruoka et al. | ........... 382/163 |

OTHER PUBLICATIONS

Tekalp et al., High–Resolution Image Reconstruction From Lower Resolution Image Sequences and Space varying Image Restoration, IEEE ICASSO p. III–169–172 (1992).
Franke and Nielson, Scattered Data Interpolation and Applications: A Tutorial and Survey, Geometric Modeling (Hagen and Roller, eds.1991).
Patti et al., Superresolution Video Reconstruction with Arbitrary Sampling Lattices and Nonzero Aperture Time, IEEE Transactions on Image Processing, vol. 6, No. 8 (Aug. 1977).

* cited by examiner

*Primary Examiner*—Andy Rao
(74) *Attorney, Agent, or Firm*—Chernoff, Vilhauer, McClung & Stenzel, LLP

(57) ABSTRACT

A system constructs a high resolution image from a plurality of low resolution images where each of the low resolution images includes a plurality of color planes. The system receives the plurality of low resolution images where the plurality of color planes of each of the low resolution images are spatially arranged in at least a partially non-coincident manner. Motion data representative of motion of at least a portion of the low resolution images is determined. The high resolution image is constructed, having a resolution greater than the low resolution images, based upon the non-coincident color planes of the low resolution images, together with the motion data.

74 Claims, 10 Drawing Sheets

RESOLUTION IMPROVEMENT FOR MULTIPLE IMAGES

This application claims the benefit of Ser. No. 60/166,552 filed Nov. 19, 1999.

The present invention relates to increasing the quality of images obtained from a low resolution source.

It is often desirable to create a printed copy of an image obtained from a video source or camera, such as digital still camera or digital video camera. However, digital still cameras and digital video cameras typically have low spatial resolution as compared with the resolution of many current printers. Accordingly, the quality of the printed image obtained by such sources is of low quality, and generally unacceptable.

Increasing the resolution of the image beyond the resolution of the imaging sensor may be used to create an improved output image. One method to increase the resolution of a particular image is to use interpolation techniques based on a single image. Linear interpolation techniques based on a single image do not increase the actual information content of an image. In fact, linear interpolation of a single image simply increases the number of pixels and/or lines in the image. Non-linear interpolation techniques based on a single image utilize information about the image structure itself, such as for example, direction of edges and image object geometry, to increase the number of pixels and/or lines in the image. In some cases, non-linear techniques may result in an improved image quality over linear techniques. Examples of single image techniques include, U.S. Pat. Nos. 5,579,451; 5,579,445; and 5,880,767.

Increasing the resolution of an image beyond the resolution of the imaging sensor by processing multiple images of the same or similar image provides a suitable technique to potentially create higher quality images from cameras equipped with inexpensive low resolution sensors. This also permits the creation of higher resolution images than the physical capability of any given sensor for any particular imaging device.

In general multi-frame image enhancement techniques include a low resolution digital camera, either a still camera or video camera, that acquires two or more aliased image of the same scene in such a way that the only differences between the shots are due to camera motion. The motion may be from hand-held jitter or it may be artificially induced. The artificial inducement may be mechanical vibrations of the camera or by movement of the scene relative to the sensor by electronic, mechanical, optical techniques, or combinations thereof. In this way each captured frame is a slightly different low resolution sampling of the scene. Film based images may be used with subsequent sampling, such as with a digital scanner.

One image from the low resolution sequence of images is selected to be the reference image. This is typically the first image but the reference image may be another image, if desired. Depending on the motion estimation algorithm it may turn out that the choice of a later image produces better motion estimation. The coordinate system of the reference sampling lattice is then used to define the high resolution sampling lattice on which the enlargement is constructed. The high resolution sampling lattice is in effect an up-sampled low resolution reference frame. In other words, the techniques typically use the coordinate system from the low resolution reference frame from which to define the high resolution reference frame.

Next, global motion between each low resolution sequence image and the reference image is estimated by any of several techniques including optical flow, and single- or multiple-model parametric methods. This results in one of two possible sets of motion vector "fields" that relate the low resolution sequence of frames to the reference frame and, therefore, to the derived high resolution sampling lattice. The motion vectors may be explicitly defined, as with an optical flow technique, or implicitly defined through motion model parameters associated with each low resolution frame. "Explicitly defined" generally refers to where individual pixels or groups of pixels are mapped from one frame to another. "Implicitly defined" generally refers to a mathematical model with parameters that relate the frames with respect to each other. Explicit motion vectors can always be generated by evaluating the motion model at every pixel location.

Once the relationship between the low resolution frames and the high resolution sampling lattice is established, construction of the enhanced resolution image proceeds. The principle underlying this technique is that each low resolution image contains unique information about the scene, and is not merely duplicative. This is because each image is an aliased representation of the scene, and each image is the result of sampling the scene on a different lattice.

The reconstruction of the frame involves the combination of the information in the reference frame and additional unique information from the remaining low resolution frames to build a new image on the high resolution sampling grid that has more resolution than any one of the low resolution frames. The combination is driven by the vector data delivered from the motion estimator.

Referring to FIG. 1, a general technique is shown for purposes of illustration. A low resolution sequence of four frames 20a, 20b, 20c, and 20d, depicting a corresponding scene is an input to a motion estimation module 22 and an enhanced resolution multi-frame reconstruction module 24. The scene is positioned slightly differently relative to the sampling grid of each low resolution frame 20a–20d due to camera motion or any other relative motion, as previously described. The sampling grid of dots shown is merely illustrative, with the actual sampling grid typically having a much finer pitch. Associated with each sampled scene is an underlying spatially continuous band-limited image which the samples represent via the Sampling Theorem. The continuous-space images 26a and 26c for the reference frames 20a and 20c are shown directly below their respective frames. There are small differences between the frames 26a and 26c which are due to an assumed aliasing. These differences represent unique information in each frame that is used by the reconstruction algorithm for the high resolution frame. The differences are more visible in the magnified continuous-space images 28a and 28c shown below the reference frames 20a and 20c. The magnified images 28a and 28c represent single-frame linear-system enlargements of the associated sampled images, at the same scale as an enhanced enlargement 30, hence the aliasing artifacts are also enlarged. This linear process of enlargement to obtain magnified images 28a and 28c enlarges the aliasing artifacts. Some of the differences are noted with small arrowheads in the enlarged continuous-space image references 28a and 28c. Neither enlargement 28a and 28c contains more resolution than the un-magnified images 26a and 26c. To the left of the high resolution enhanced enlargement 30 is the associated underlying continuous image 32 from which may be clearly observed a definite resolution improvement.

Referring to FIG. 2, one potential set of motion vector fields is illustrated that can result from motion estimation, as implemented by Tekalp, Ozkan, and Sezan, "High- Resolution Image Reconstruction From Lower-Resolution Image Sequences And Space-Varying Image Restoration", IEEE International Conference on Acoustics, Speech, and Signal Processing, (San Francisco, Calif.), Volume III, pages 169–172, Mar. 23–26, 1992. Tekalp et al. teach that each pixel in each low resolution frame has associated with it a motion vector pointing back into the reference image to the (possibly non-pixel) location from where the pixel comes. The sequence shows an N-frame sequence in which the scene has slightly differing positions relative to the sampling lattices in each frame (similar to FIG. 1). The motion vector 40 points out of a pixel in frame 42a and into the reference frame 44 at the same (non-pixel) scene location. Similarly there are motion vectors for the remaining pixels of frames 42b–24N. The collection of vectors from a single frame constitute one vector field. The N−1 vector fields are abstractly represented by the curved arrows 46a, 46b, and 46N which emanate from the low resolution frames 42a–42N and point back to the reference frame 44. There is also the identity vector field pointing from each reference pixel to itself.

Since the high resolution sampling lattice is defined by the coordinate system of the reference frame 44, the motion vectors may be considered as pointing directly into the high resolution lattice associated with the reference frame 44. Referring to FIG. 3, an exemplary high resolution lattice 50 is shown with a magnification of two. The open circles are the high resolution pixel sites. Each cross "+" is the head of one motion vector whose tail starts at a pixel in one of the low resolution frames. Therefore, each cross represents an intensity value from one low resolution pixel. For this example, it is presumed that the motion is random so that the location of most of the crosses are likewise randomly positioned. However, the field pointing from the reference to itself is shown by crosses inside circles with even coordinates. These crossed circle sites correspond to pixels from the reference frame. In general all, or part, of the reference pixels will map directly onto high resolution sites because the relationship between the high resolution lattice and the reference lattice is merely a scaling operation.

The resulting pixel sites are clearly scattered mostly at locations that do not match the high resolution lattice 50 sites (open circles and crossed circles). Accordingly, it is clear that a non-uniform interpolation technique must be used to reconstruct the resulting high resolution image. In any case, a non-uniform interpolation must be defined which can use whatever random low resolution pixels fall within a high resolution site's general region to interpolate the intensity of a high resolution pixel. This region may be referred to as the support or footprint 51 of the non-uniform interpolation kernel. In FIG. 3, the support of a typical kernel is shown in grey, centered on the high resolution pixel to be interpolated. Special attention must be paid to regions, such as the lower right corner of the frame, where low resolution pixel density is low. Given that low resolution pixels can fall within the kernel at arbitrary locations the required non-uniform interpolation tends to be complex and computationally intensive. In addition, an entire low resolution sequence must be available throughout the reconstruction process to store all the pixels mapped onto the high resolution frame. Accordingly, products incorporating the technique shown in FIGS. 2 and 3 need a relatively large amount of on-line RAM to store data representing the required frames.

It is noted that Patti et al. teach the use of the aforementioned motion vectors with monochrome low resolution frames sampled on a quincunx grid to reconstruct a high resolution image on an orthogonal lattice. However, Patti et al. do not teach a direct reconstruction technique nor does Patti et al. teach how to process color frames. Instead of a direct non-uniform interpolation within the high resolution frame, Patti et al. teach an indirect technique of Projection onto Convex Sets, to compute increasingly better approximations of the scene sampled on the high resolution grid, at substantial computational expense.

Another potential set of vector fields 172 from the motion estimator is illustrated in FIG. 4. It is noted that the illustrations and discussion related to FIGS. 4 and 5 is provided but no admission is made that in fact such material is "prior art", unless explicitly stated as "prior art". The vector fields of FIG. 4 point out of the reference frame and into each low resolution frame, in contrast to the technique shown in FIGS. 2 and 3. In particular, at each reference pixel there is one vector pointing to the corresponding scene location in each low resolution frame. Hence, not counting the identity vector pointing from a reference pixel to itself, there are N−1 outbound vectors at each reference pixel for an N length sequence of frames. In FIG. 4, one such group is shown on the reference lattice 171. The head of each numbered vector locates the position of the tail in the low resolution frame of the same number.

Since the high resolution lattice is defined by the coordinate system of the reference lattice, the vectors may be located directly on the high resolution lattice at those points which correspond to reference pixels, as shown in FIG. 5. FIG. 5 illustrates several interior vector groups with the remaining points having similar vector groups. When the motion estimator has delivered explicit vectors (as with optical flow) then the missing groups are interpolated from surrounding vectors by means of a multi-channel interpolation filter, such as a vector median filter. Alternatively, when a parametric motion estimator is used the derived motion models can be directly evaluated to obtain the missing vectors.

After the vector groups have been defined at all high resolution grid points the intensity reconstruction may be performed. Associated with each site in the grid is an intensity value derived from precisely one low resolution frame. Next the computation of the intensity at each high resolution site is performed. Each of the N motion vectors at each site (including the identity vector) points to a position in one low resolution frame. This defines N distances $\{\|v_k-p_k\|:k\epsilon\{1, \ldots, N\}\}$ where $v_k$ is the (generally non-pixel) position in the $k^{th}$ frame, $F_k$, to which the associated motion vector points and $p_k$ is the existing low resolution pixel in $F_k$ closest to $v_k$. That is $P_k=\arg\min\{\|v_k-p\|:p\epsilon F_k\}$ where p denotes a lattice point in $F_k$. The norms (metrics), $\|\cdot\|$, in these expressions, are left unspecified and depend on the geometry of the sampling grids involved.

The frame, $F_k$, which has associated with it the smallest of the N distances becomes the frame from which the desired high resolution intensity is computed. An intensity based on the closet pixels is now associated with $v_k$. This defines the intensity at the high resolution site to be reconstructed. Preferably the intensity at $v_k$ is that at $p_k$. That is, the technique simply copies the intensity at $p_k$ into the high resolution site. It may be observed that this scheme is consistent with copying reference intensities into those high resolution sites that correspond to reference lattice points.

SUMMARY OF THE INVENTION

The present invention relates to a system for constructing a high resolution image from a plurality of low resolution images where each of the low resolution images includes a plurality of color planes. The system receives the plurality of low resolution images where the plurality of color planes of each of the low resolution images are spatially arranged in at least a partially non-coincident manner. Motion data representative of motion of at least a portion of the low resolution images is determined. The high resolution image is constructed, having a resolution greater than the low resolution images, based upon the non-coincident color planes of the low resolution images, together with the motion data.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

The present inventors considered these image resolution enhancement techniques for implementation on consumer devices that typically use low resolution sensing devices. Upon further thought, the present inventors noted that in the preceding techniques two implicit assumption were made. First, the low resolution and high resolution sampling lattices are orthogonal. Second, the color images are composed of three coincident color planes. In other words, each of the colors, e.g. red, green, and blue, are on top of one another at each sampling point (co-sited).

The majority of consumer grade still and video cameras use a single charge coupled device (CCD) sensor to capture and sample the scene. Color imagery is obtained by preceding the sensor with a color filter array which effectively sub-samples the images by color field (i.e. plane) onto three non-coincident lattices. Each sampled color field is then interpolated onto an orthogonal grid whose geometry is normally identical to the sensor. This step is termed color filter array ("CFA") interpolation. Linear and non-linear sharpening is often applied in tandem with CFA interpolation to decrease the severe loss of resolution due to the color field sub-sampling of the CFA. In general, CCDDSP refers to the combination of algorithms that transform the CFA sub-sampled raw image into a displayable color picture. It is to be understood that the sub-sampling and/or CFA may use any pattern desired, even if non-orthogonal or irregular. The terms "planes" and "fields" are used interchangeably and have the same meaning.

Figure 6:
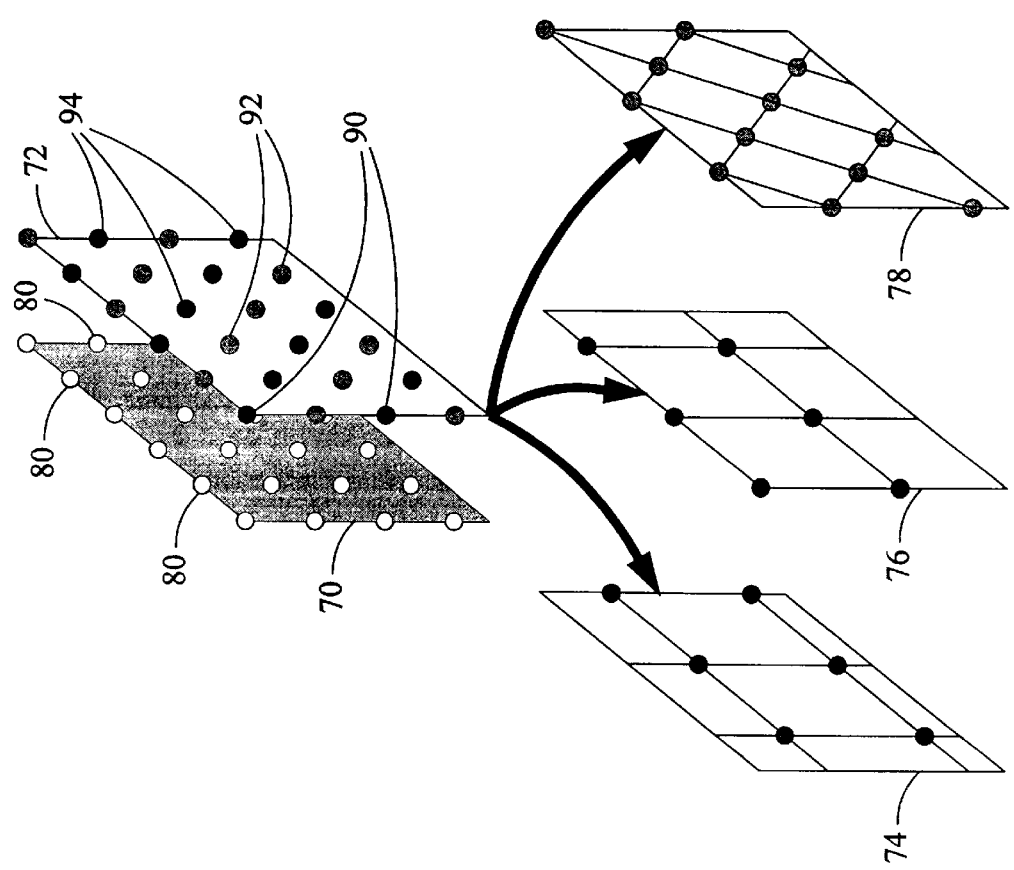
FIG. 6 illustrates a single charge coupled device with a Bayer Color Filter Array (CFA) decomposed into individual color fields.
Figure 7:
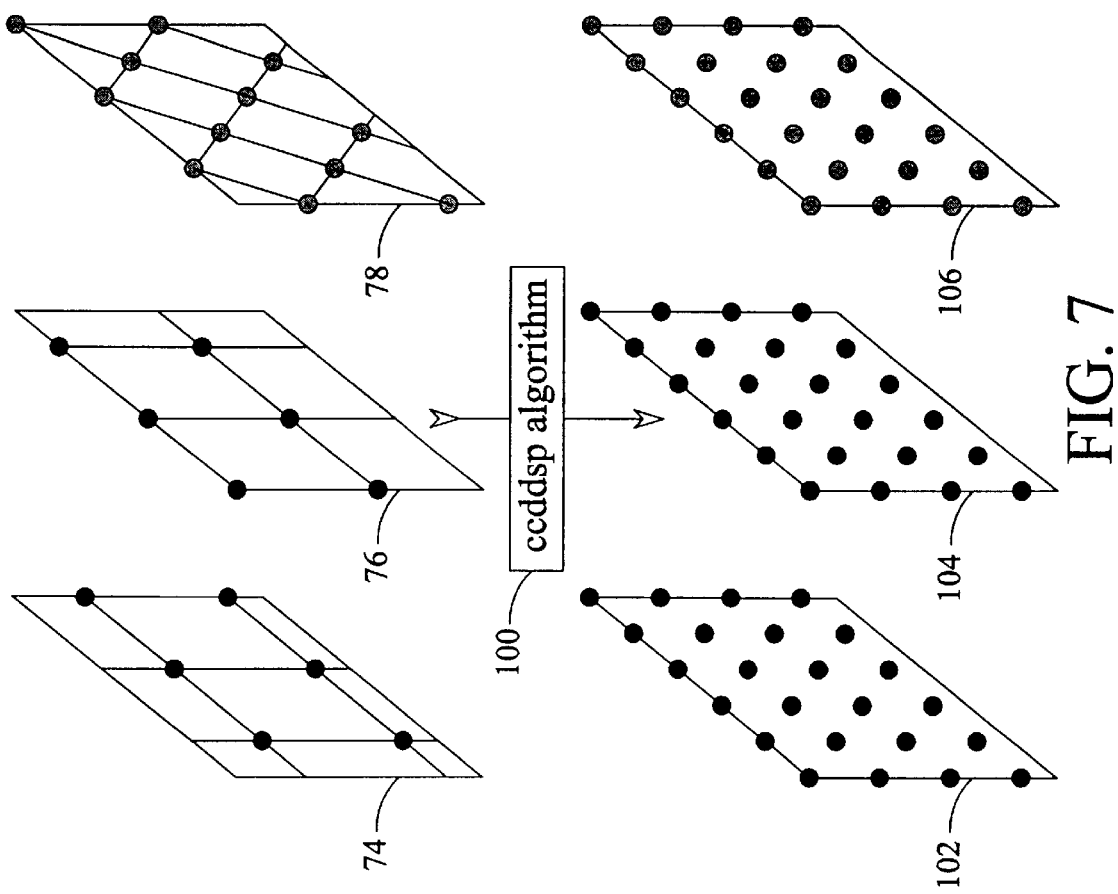
FIG. 7 illustrates the role of a CCDDSP to interpolate each color field of FIG. 6.

One technique for extracting color images from a low resolution CCD sensor is illustrated in FIG. 6. The individual sensors on the CCD sensor 70 are illustrated abstractly by a series of spaced apart circles 80. The CCD may include any pattern. In order to use a single CCD sensor 70 to capture a multi-color image, e.g. red, green, and blue, prior to image acquisition by the CCD sensor 70 the input image is spatially sub-sampled by a color filter array 72. The color filter array 72 is a filter that permits different colors of light to pass through at different spatial positions. One preferable pattern for the color filter array cells is known as a Bayer Pattern, available from Eastman Kodak Co., as illustrated by the color filter array 72. The Bayer Pattern arrangement of the red 90, green 92, and blue 94 filters is shown. The Bayer pattern is decomposed into three non-coincident sub-lattices, namely a blue sub-lattice 74, a red sub-lattice 76, and a green sub-lattice 78, which serve to sub-sample the image according to color field. The red color field 76 and blue color field 74 are orthogonally sampled in each direction at one-half the sampling rate of the CCD and the green color field 78 is sampled on a quincunx grid that is half as dense as the CCD, with a different geometry than the red color field 76 and blue color field 74. Referring to FIG. 7, the red color field 76, blue color field 74, and green field 78 are transformed by the CCDDSP algorithm 100 into three coincident color fields, namely, a blue color field 102, a red color field 104, and a green color field 106. Preferably the observed image contains little or no motion during the acquisition of the images. It is also to be understood that any set of colors may be used, such as for example, (hue, saturation, intensity), CMYK, or any other color space. It is to be understood that two or more of the color planes may be coincident with one another, if desired. Also, some portions of the image maybe coincident and non-coincident, if desired.

Figure 8:
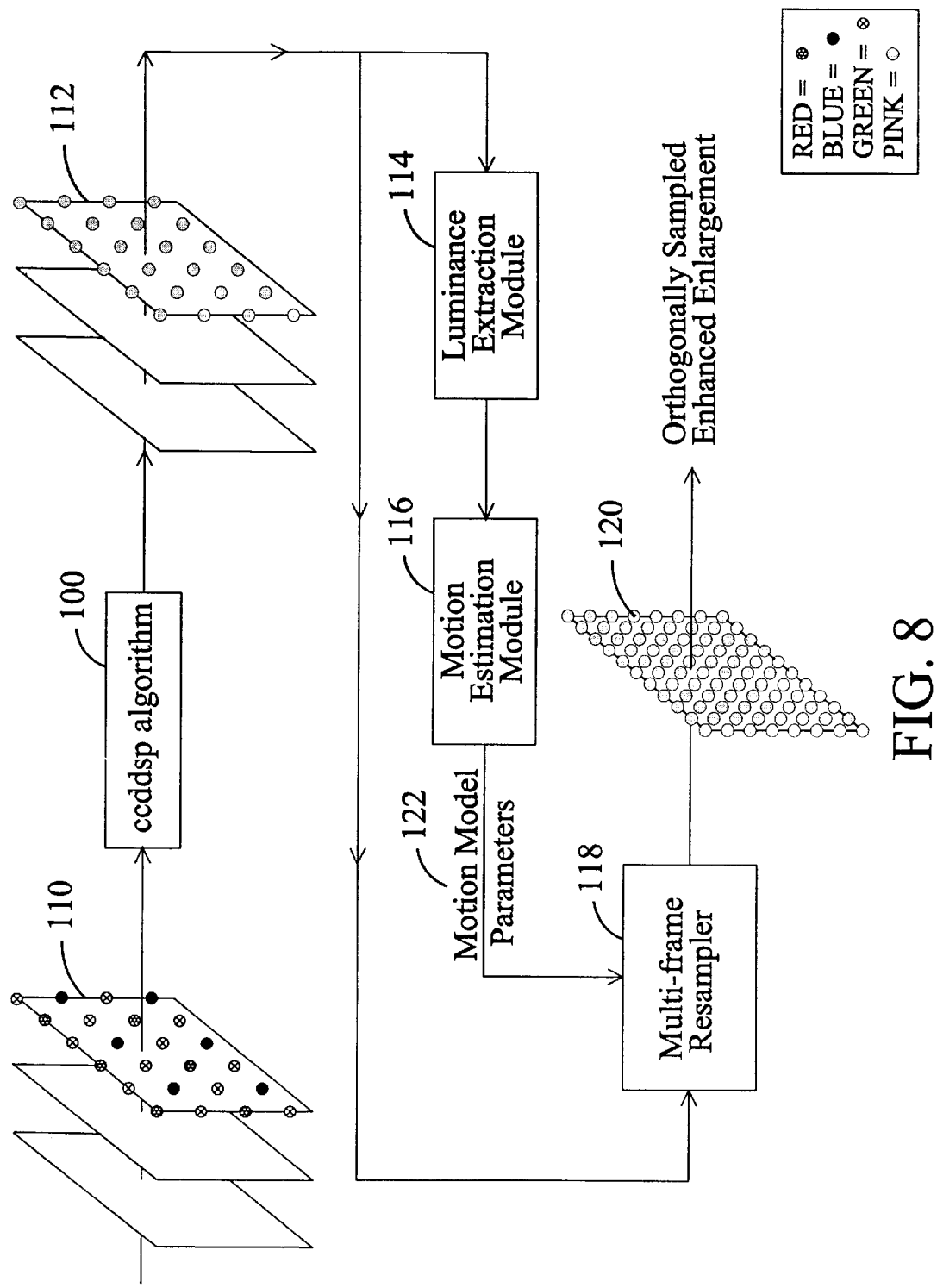
FIG. 8 illustrates an image processing system to reconstruct a high resolution image from a plurality of low resolution images.

One potential system for enhancing image resolution is shown in FIG. 8. A series of low resolution CFA-sampled frames 110 enter the CCDDSP algorithm 100 which are converted to full color (red, green, and blue) low resolution images 112 sampled on a lattice identical to the camera sensor. Each pixel in each of the frames 112 represents co-sited triples (red , green, and blue) and is noted as "pink" simply for illustration (e.g. there is no significance to the term pink). The luminance field of each frame is extracted by a luminance extraction module 114 and used by the motion estimation module 116. The motion estimation module 116 is preferably parametric in nature. The motion model parameters 122 together with the pre-processed low resolution color frames 112 are inputs to a multi-frame resampler 118. Since the color fields are not only mutually coincident but coincident with the luminance field, the motion parameters 122 may be directly applied to each color field. The multi-frame resampler 118, using any suitable technique such as those previously described, performs enhanced enlargement on each color field as though it was a single monochrome image. The results are then combined to generate an enhanced enlargement of the reference frame. The present inventors came to the realization that the CCDDSP introduces small artifacts into the images, especially during sharpening operations that increase the contrast across white/black transitions. Such an increase in contrast is typically done by introducing transition overshoot that is narrow enough to go un-noticed but collectively give the illusion of increased resolution. When a CCDDSP pre-processed image is enlarged the width of the overshoot increases to the point of visibility causing many edges to have an unsightly white halo or black shadow. Normally such artifacts are not noticeable and are therefore of little importance.

Figure 1A:
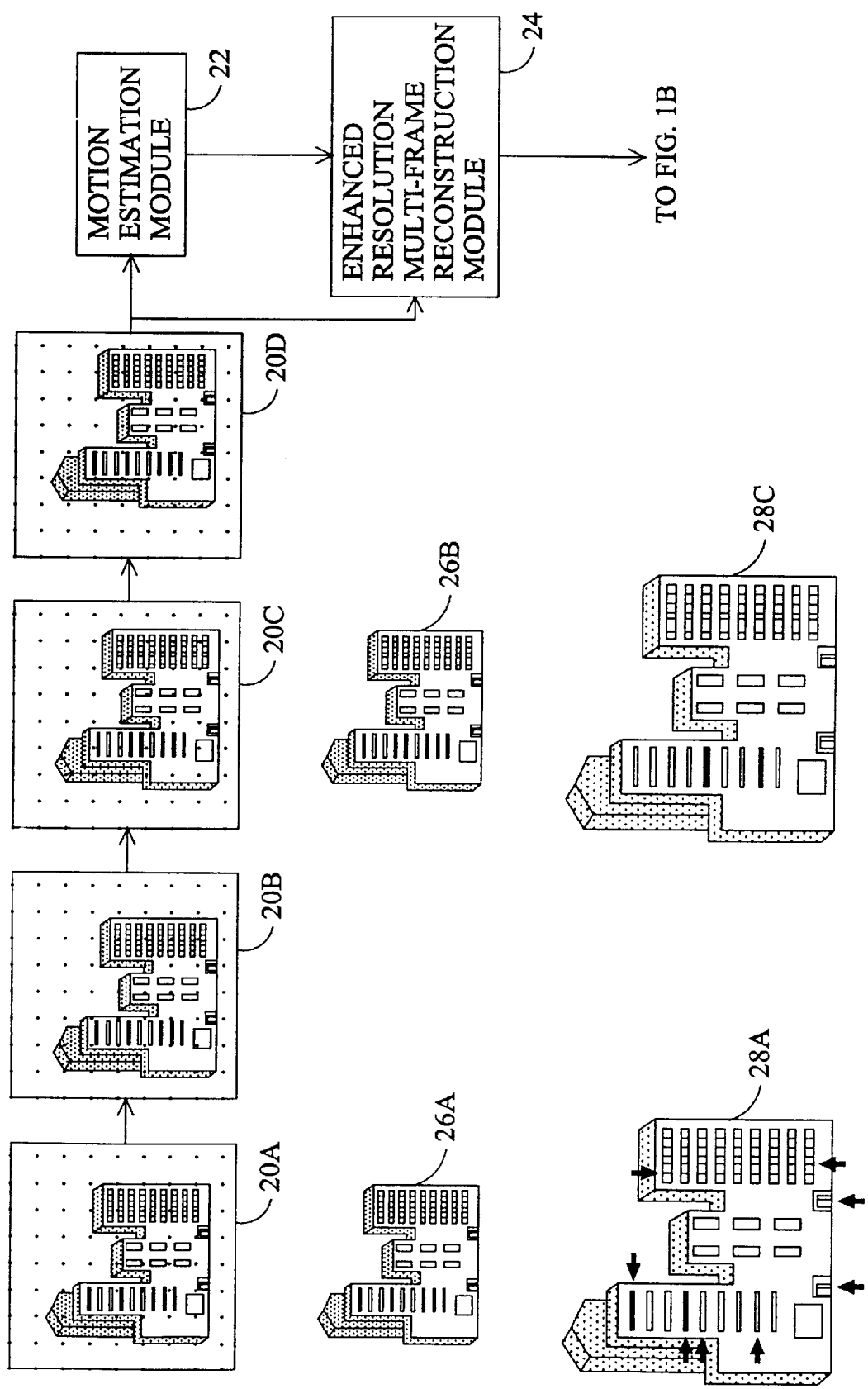
FIGS. 1A and 1B illustrates a general technique for enhanced resolution by multi-frame re-sampling.
Figure 1B:
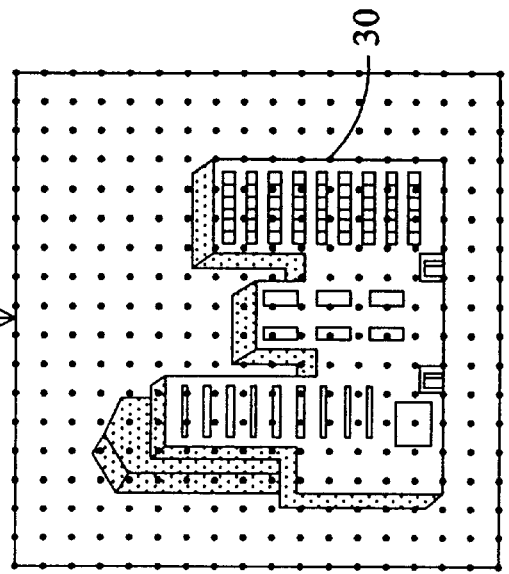
Figure 1B:
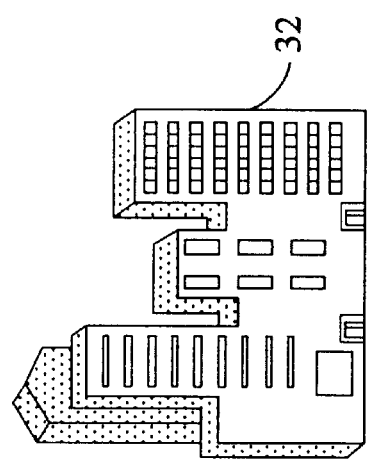
Figure 2:
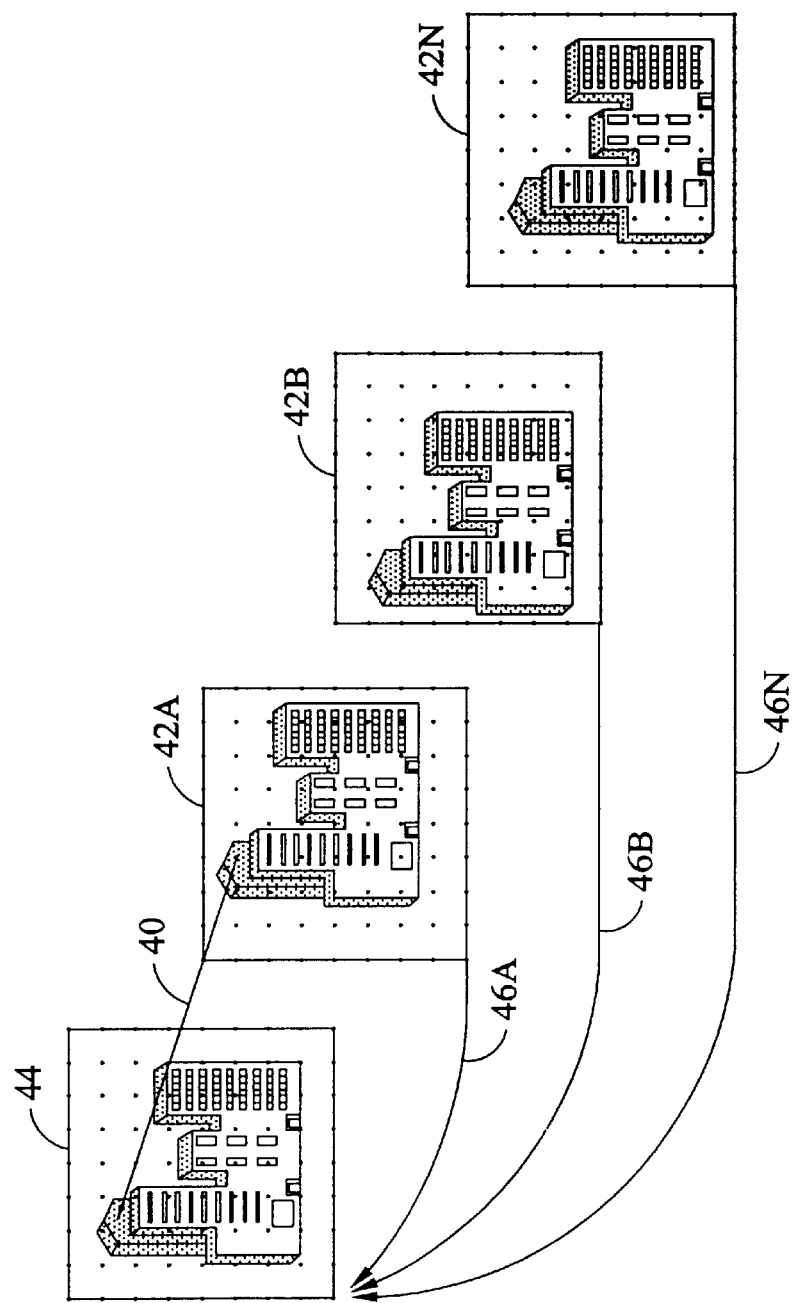
FIG. 2 illustrates one potential set of motion vector fields that can result from motion estimation.
Figure 3:
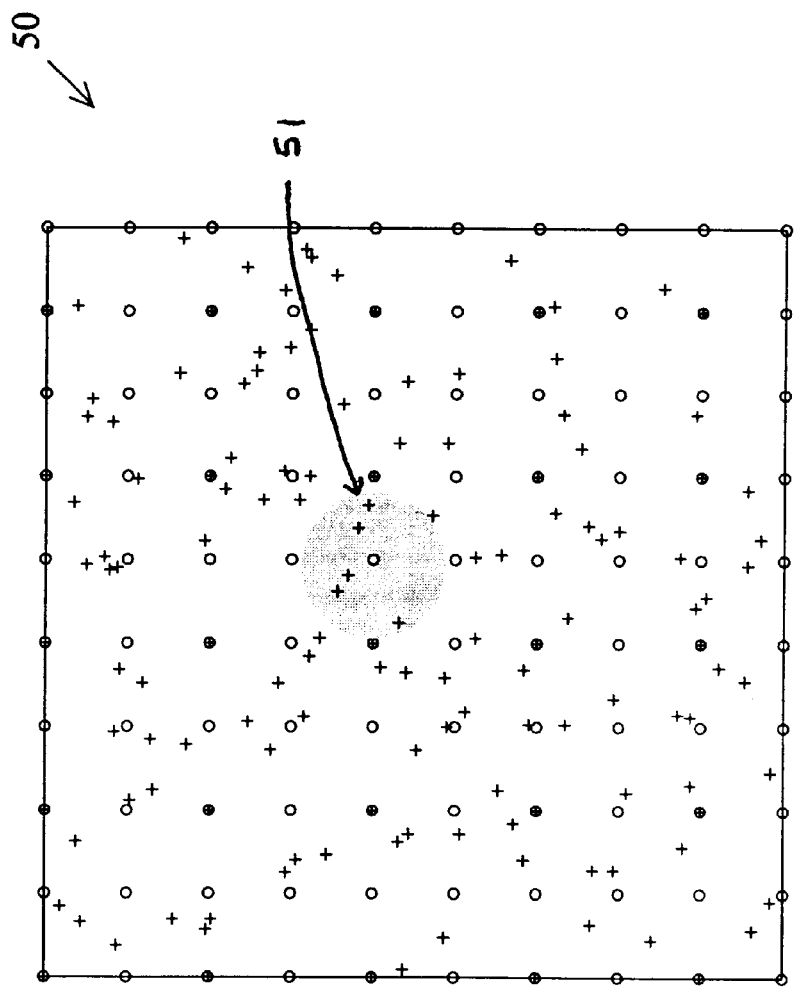
FIG. 3 illustrates one potential high resolution lattice resulting from the motion estimation of FIG. 2.
Figures 4, 5:
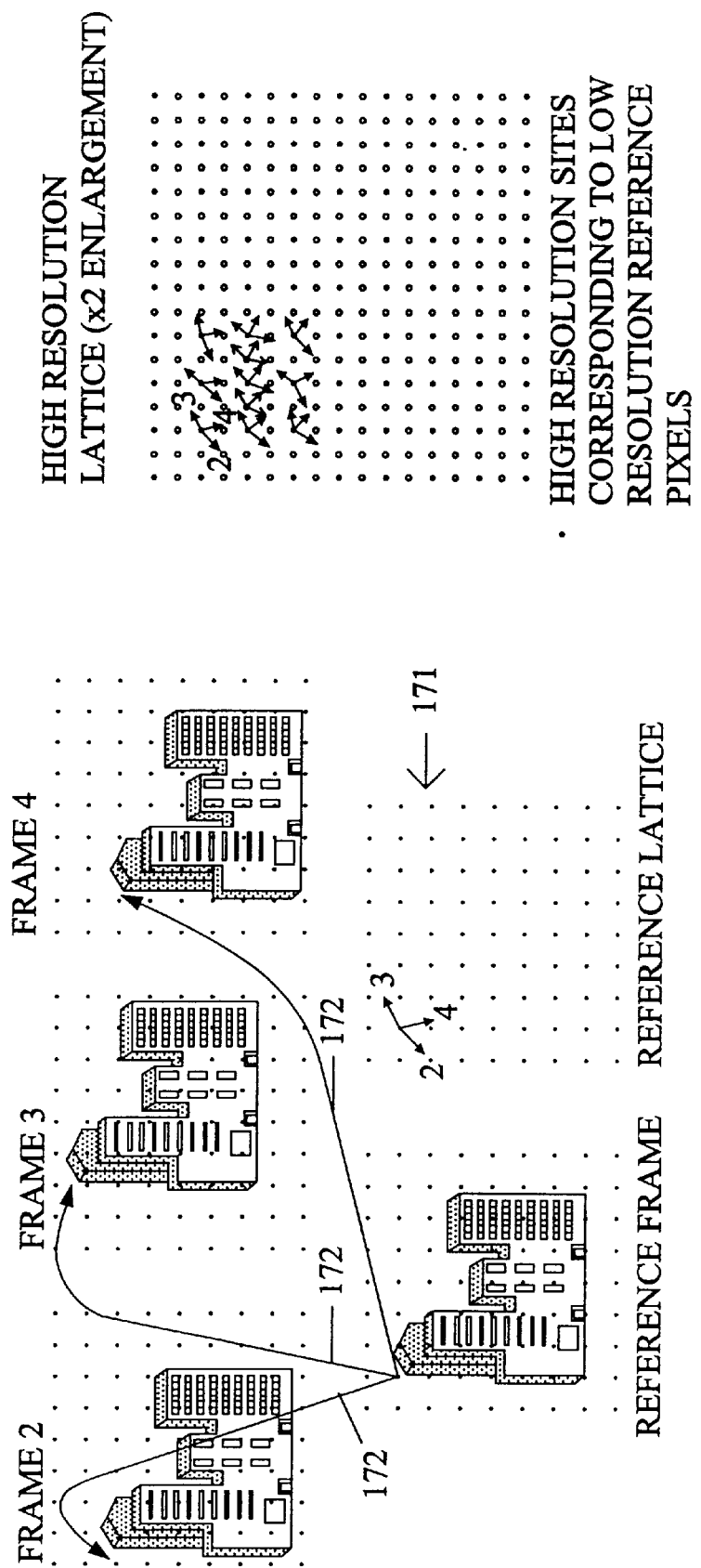
FIG. 4 illustrates another potential set of motion vector fields than can result from motion estimation.
FIG. 5 illustrates the set of motion vectors as seen from the point of view of the high resolution lattice.

Using the method described in relation to FIGS. 4 and 5 in the multi-frame resampler 118 may be viewed as an algorithm that recombines the different low resolution aliased images in a way that transforms the aliased frequency components back into the high resolution components that aliased when the scene was sampled, assuming the relative phases of the aliased components is correct. Based upon this understanding, the principal disadvantage of using the method described in relation to FIGS. 4 and 5 together with the system of FIG. 8 is that the interpolation and sharpening done by the CCDDSP disturbs the phase relationships between the aliasing components of the low resolution images. This, in turn, limits the amount of achievable resolution improvement.

Figure 9:
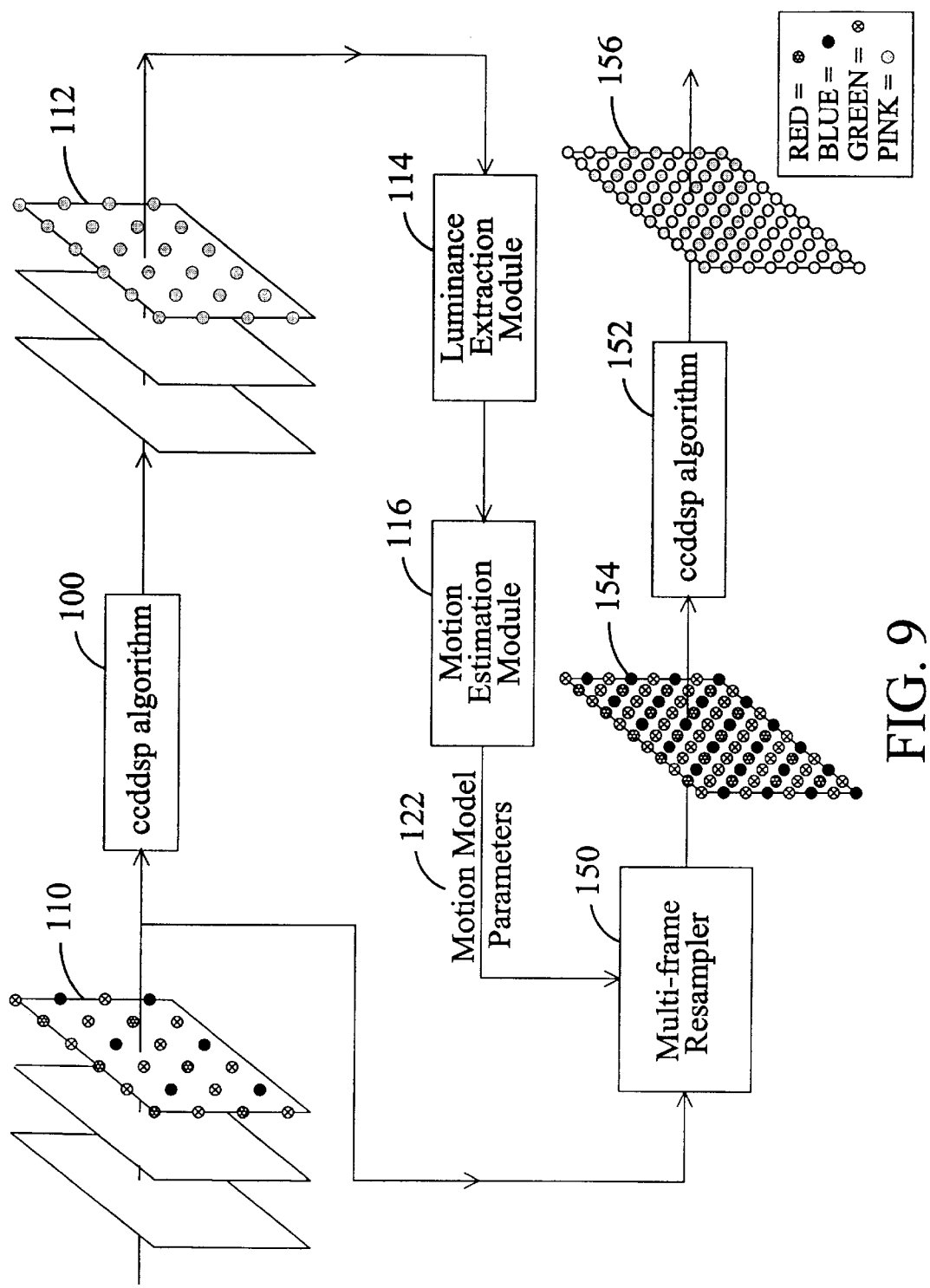
FIG. 9 illustrates another image processing system to reconstruct a high resolution image from a plurality of low resolution images.

Referring to FIG. 9, the present inventors came to the realization that the disturbance of the phase relationships and artifacts of the CCDDSP algorithm may be overcome by performing the enhancement directly on the data from the CFA sampled frames 110. The data from the CFA sampled frames 110 is input to the multi-frame resampler 150 thereby bypassing the motion estimation module 116 and luminance extraction module 114. The motion data should be based on at least a portion of the low resolution images. The multi-frame resampler 150 processes the frames, as described later, to output a high resolution frame 154. The high resolution frame 154 is then preferably passed through another CCDDSP algorithm 152 to produce a sampled enhanced enlargement frame 156 with all color planes being coincident and suitable for display or reproduction.

Preferably the multi-frame resampler 150 performs the re-sampling onto a high resolution lattice having the same CFA geometry as the low resolution lattice. In this manner, many of the pixels will already be in the proper location by mere selection of the high resolution lattice. The preferred CFA geometry is a Bayer pattern, as previously discussed. Alternatively, the multi-frame resampler 150 may perform the re-sampling onto a high resolution orthogonal lattice, thus avoiding the CFA-interpolation step of the CCDDSP algorithm 152. It is to be understood that the multi-frame resampler 150 may use any regular or irregular sampling grid, as desired. It is also to be understood that the coordinate system for the enhanced high resolution frame may be based on one or more low resolution reference frames or on a "virtual" reference frame not based on any of the low resolution frames. It is likewise to be understood that any portion of any of the low resolution frames may be used, such as an interior portion.

Preferably motion related data is obtained by using the CCDDSP algorithm 100 together with a luminance extraction module 114 and the motion estimation module 116. Alternatively, motion related data for the multi-frame resampler 150 may be obtained in any manner. It is likewise to be understood that no particular color, if any, is necessary used to obtain the motion estimation data. Further, the motion data may be predetermined if the movement between the frames is known, and accordingly the explicit calculation of the motion data may be avoided. In addition, it is to be understood that a portion of the calculated motion data may be discarded, if desired, such as based upon a quality analysis of the motion data. Also, the motion data may be based on one or more of the color planes, or merely a portion of one or more of the color planes.

In one embodiment, the raw green color fields from the CFA sampled frames 110 may be the input to a motion estimator designed to process non-orthogonal lattices. In another embodiment, the raw green color fields from the CFA sampled frames 110 can be first interpolated onto an orthogonal grid and then input to a motion estimator designed to process orthogonal lattices. The present inventors came to the realization that using green alone for motion estimation may, under some circumstances, provide improved motion estimates because the aliasing in the highly sub-sampled red and blue fields tends to corrupt the motion estimates.

In another embodiment, the motion estimation may be performed separately on two or more of the color fields within a frame and compared against each other for consistency. If the estimates are consistent between any two fields, then the motion vectors (or parameters), generally referred to herein as motion related data, can then be appropriately combined before being used as the input to the reconstruction module.

Figure 10:
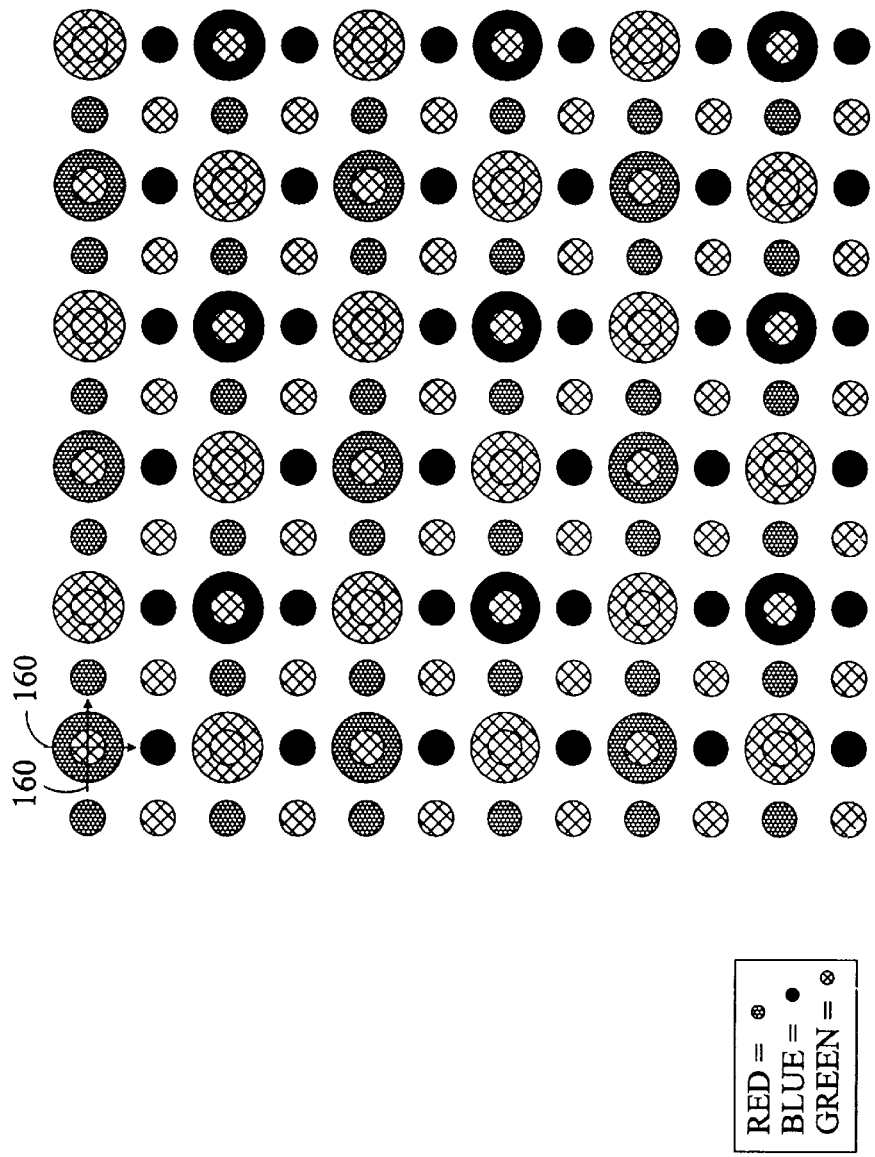
FIG. 10 illustrates the preferred embodiment of a Bayer to Bayer up-sampling by a factor of two with the system of FIG. 9.

With regard to the embodiments shown in FIGS. 1–5, the relationship between the chosen low resolution reference and the high resolution grid, where the lattice is orthogonal and the color fields are coincident, is trivially determined by the horizontal and vertical factors of enlargement. For example, in FIGS. 3 and 4 a ×2 magnification is shown. No trivial relationship exists between the low resolution lattice, and in particular each color field 74, 76, and 78 of the CFA sampled frames 110, to a high resolution lattice. After considerable thought the present inventors determined that the preferred sampling grid is shown in FIG. 10. The large disks represent pixel sites in the raw reference frame and the small disks represent pixel sites in the high resolution frame. A pair of axes 160 identify the origin of coordinates in the reference frame. In the preferred embodiment for (×2) up-sampling the origin of coordinates for the high resolution frame is selected such that each low resolution green pixel is co-sited with a high resolution green pixel. This selection was identified and selected because the green field carries nearly 60% of the luminance information and because this fills the largest number of high resolution sites directly from the reference frame. If the high resolution grid were chosen to force alignment either between the high resolution red and reference red, or high resolution blue and reference blue, then only $\frac{1}{16}$ of the sites would be defined. By selecting the alignment of the green fields, twice the number of sites are defined. It is noted that in the orthogonal alignment, because of the coincidence of the color fields, when the high resolution greens are aligned with the reference so are the other two colors so that $\frac{1}{4}$ of all high resolution pixels get defined by the reference.

If the desired high resolution lattice is to retain a Bayer pattern then the small dots representative of reconstructed high resolution samples need to have a particular pattern. The large dots representative of the original low resolution samples illustrate that the green lattice sites may be properly aligned. However, the original red low resolution samples need to be shifted, such as a one high resolution pixel to the left, so that the reconstructed high resolution red pixels are in the proper alignment. Similarly, a shift should be performed for the blue low resolution samples.

Referring to FIG. 10, it is clear that in the case of ×2 magnification that the embodiments shown in FIGS. 1–3 and FIGS. 4–5 together with the system shown in FIG. 8 will perform ideally if supplied with four low resolution frames with purely translational motion vectors of {(0,0), (0,0.5), (0.5,0), (0.5,0.5)} because such motion will supply all the needed pixels in the high resolution lattice among the four low resolution frames. Indeed, the case of the embodiment shown in FIGS. 1–3 no interpolation need be done because the mapped low resolution pixels will be at the proper locations in the high resolution grid. The motion data in this case may be considered to be predetermined and no explicit calculation need be done. However, when using the system shown in FIG. 9, this translational relationship no longer remains true. From FIG. 10 it may be observed that if four low resolution frames are used having purely translational motion such that all the high resolution green pixels are contained in the four frames, then none of the red or blue low resolution pixels can be directly used for they will not align with high resolution red or blue pixels in the high resolution grid. This is apparent from FIG. 9 by noting that the alignment of the low resolution green pixels with the high resolution green pixels forces a mis-alignment of the low resolution red pixels. That is, when low resolution green are co-sited on the high resolution greens then no low resolution red (blue) pixel is co-sited with a high resolution red (blue) pixel.

The implication is that a minimum of 12 raw Bayer frames are needed for (×2) enhanced enlargement, 4 frames for each color field. This would initially appear to be disadvantageous, but there is no more data in 12 raw frames than in 4 CCDDSP pre-processed frames. In addition, the 12 raw frames carry up to three times the information content of the four pre-processed frames since 12 independent samplings of the scene is available. This is a contributing factor to increasing the resolution. This relationship between the number of raw frames of data used may be extended to any number of frames actually used in a particular implementation.

Upon further consideration, the present inventors came to the realization that the motion vectors that are delivered from an orthogonally sampled luminance channel do not map directly into the high resolution lattice. This is due to the mis-alignment, in the preferred embodiment, between the origins of coordinates for the high resolution red and low resolution red, and between high resolution blue and low resolution blue. Therefore, the motion vectors or parameters supplied by the estimator are adjusted to account for the change in the lattice. In addition, the motion vector adjustments will normally be different for each color.

Upon even further consideration, the present inventors came to the realization that the norm (metric) for measuring the distances in the raw green field should be different than that used for the red and blue fields, which are similar in nature. The red and blue Bayer sub-lattices are orthogonal and accordingly the same norm, preferably the $\mathbf{1}_1$ norm is used, if desired. The green sub-lattice is quincunx for which a different norm should be used. Observing that the green quincunx lattice is a scaled orthogonal lattice rotated by 45 degrees, a scaled $\mathbf{1}_\infty$, or minmax, norm can be used for measuring distance in the green field since the relationship between the $\mathbf{1}_1$ and $\mathbf{1}_\infty$ unit spheres is the same as that between the lattices. This produces consistent choices of "closest pixel" across color fields. The $\mathbf{1}_1$ and $\mathbf{1}_\infty$ norms may be defined as follows:

If $x=\{x_1, \ldots, x_N\}$ is an arbitrary N-dimensional vector then the $\mathbf{1}_1$ norm of x is defined by $\|x\|_1 := \Sigma^N_{n=1} |x_n|$. The $\mathbf{1}_\infty$ norm is defined by $\|x\|_\infty := \max\{|x_n| : n \in \{1, \ldots, N\}\}$.

The present inventors came to the further realization that the reconstruction technique for the high resolution image should, in the preferred embodiment, vary from reconstruction site to reconstruction site. Reconstruction may be performed by any of several methods (generally referred to as filters), such as for example, copy of the nearest neighbor, spline interpolation, non-linear interpolation, and spatially varying techniques. For example, the reconstruction technique might vary between "copy nearest neighbor" and "bilinear interpolation" depending on how close the low resolution site to be interpolated is to an existing low resolution pixel.

As a matter of clarification, one example of a potential dependance on the position will be explained for the one-dimensional case. The example directly extends to multiple dimensions. For example, lets take the case of two interpolation methods (it is to be understood that more may be used, if desired): copy nearest neighbor (referred to as method "C") and linear interpolation (referred to as method "B" for bilinear interpolation). "0" is used to denote the pixels of the current (1-dimensional) frame which the technique has selected, and "X" is used to mark the position in this frame of the preferred intensity. In other words, "X" is the location in the selected low-resolution frame of the high-resolution site that is being reconstructed. Now suppose "X" coincides with a "0". Then, the technique simply copies the intensity at "0" to the high resolution site that is being reconstructed because "0" is precisely the desired intensity.

Eight other situations are as follows:

| 1 | 0 | X |   | 0 |
| 2 | 0 |   | X | 0 |
| 3 | 0 |   | X | 0 |
| 4 | 0 |   | X | 0 |
| 5 | 0 |   | X | 0 |
| 6 | 0 |   | X | 0 |
| 7 | 0 |   |   | X | 0 |
| 8 | 0 |   |   | X | 0 |

Number 1 is nearly ideal with the desired position very near an existing pixel. Numbers 2–8 get progressively worse, with 8 being the worst, meaning the desired position is maximally distant from all existing pixels. After a statistical analysis of the error made in doing "C" versus "B" the present inventors realized that "C" provides a better result than "B" for cases 1–5 or 1–6 but, for 7 and 8, "B" provides a better result.

One explanation of this result is as follows. Suppose that the system is doing a single-frame enlargement (interpolation) by two. In it well known to those skilled in the art that (B) yields a better interpolation than (C). In particular, the squared error between a C-interpolation and an ideally interpolated image is larger than the error between a B-interpolation and the ideal.

Case 8 above, has the same result as ×2 single-frame interpolation. In that case, the system has two existing pixels and the central one is desired. So "B" should provide a better result than "C". Case 7 is near enough to 8 so that "B" still provides a better result. However, in the other cases (1–6) which do not correspond to single-frame interpolation, "C" provides better results because "B" introduces information from the "0" to the right which is far enough away and (statistically) sufficiently uncorrelated with X that it impairs the results.

One technique to use this insight is to look at the distances from "X" to the nearest pixel(s) and decide whether to use technique "C" or "B". Such a "threshold" strategy is simple and fast, but may leave switching artifacts at the threshold boundary.

Another technique is to modify the linear interpolation equation so that it smoothly changes to a copy operation at a faster rate, i.e., in a non-linear fashion, than would otherwise be implied by the bilinear interpolation itself as the system transitions from case 8 to case 1. The exact form of non-linearity equation will depend on the dimensions (one dimension or multiple dimensions) and the types of filters available.

It is to be understood that the size of the high-resolution frame in terms of the number of pixels is greater than the size of the low resolution frame in terms of the number of pixels. Also, the high-resolution frame may be smaller, larger, or the same size in terms of spatial dimension as any of the low resolution frames.

The present inventors came to a further realization that enhanced low resolution images may be achieved using the system described herein. The results of the high resolution enlargement of FIG. 9 may be decimated back down to a lower resolution using a re-sampling filter. Detail not present in the original low resolution reference frame is revealed because the detail was obscured in the reference by the aliasing necessary for multi-frame enhancement. The enhanced low resolution image will also contain more data than is present in a typical anti-aliased low resolution image obtained from a consumer grade camera. The process is similar to sampling a scene with a high resolution CCD sensor and then reducing it with a high quality re-sampling filter, such as an all-zero max-flat filter.

In the case of an enhanced enlargement obtained by a low resolution digital camera, the high resolution output of the algorithm can not be effectively displayed on the low resolution monitor of the camera. However, by changing the size of the high resolution image it may be more effectively displayed and at a higher quality.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method for constructing a high resolution image from a plurality of low resolution images, each of said low resolution images includes a plurality of color planes, comprising:
   (a) receiving said plurality of low resolution images, where said plurality of color planes of each of said low resolution images are spatially arranged in at least a partially non-coincident manner;
   (b) determining motion data representative of motion of at least a portion of said low resolution images; and
   (c) constructing said high resolution image, having a resolution greater than said low resolution images, based upon said spatially non-coincident color planes together with said motion data.

2. The method of claim 1 wherein said color planes of said low resolution images are completely non-coincident.

3. The method of claim 1 wherein said motion data is implicitly defined.

4. The method of claim 1 wherein said motion data is explicitly defined.

5. The method of claim 1 further comprising constructing a first set of images, where each of said first set of images is based upon a respective one of said low resolution images, and a plurality of said plurality of color planes is at least partially coincident within each of said first set of images.

6. The method of claim 5 wherein said motion data is determined based upon said first set of images.

7. The method of claim 6 further comprising determining said motion data based upon the luminance of said first set of images.

8. The method of claim 7 wherein said color planes of said first set of images is totally coincident.

9. The method of claim 8 wherein said first set of images include data representative of red, green, and blue.

10. The method of claim 1 wherein said plurality of low resolution images is obtained by a digital imaging device.

11. The method of claim 10 wherein said digital imaging device is at least one of a digital still camera, a digital video camera, and digital scanner.

12. The method of claim 2 wherein said low resolution images are in a Bayer pattern.

13. The method of claim 12 further comprising constructing a first set of images, where each of said first set of images is based upon a respective one of said low resolution images, and said plurality of color planes is coincident within each of said first set of images.

14. The method of claim 13 wherein said first set of images is on an orthogonal grid.

15. The method of claim 5 wherein said first set of images is the result of a CCDDSP algorithm.

16. The method of claim 1 further comprising sensing said plurality of low resolution images with a single charge coupled device.

17. The method of claim 1 wherein said motion data is predetermined.

18. The method of claim 1 wherein said high resolution image has a greater size than each of said low resolution images.

19. The method of claim 1 wherein said high resolution image has a smaller size than each of said low resolution images.

20. The method of claim 1 wherein said high resolution image has a size the same as each of said low resolution images.

21. The method of claim 1 wherein said high resolution image includes said plurality of color planes spatially arranged in at least a partially non-coincident manner.

22. The method of claim 21 wherein said high resolution image is processed by a CCDDSP algorithm to construct a second image that has its color planes arranged in a coincident manner.

23. The method of claim 22 wherein said plurality of color planes is red, green, and blue.

24. The method of claim 1 wherein said motion data is determined based exclusively upon a first color plane of said plurality of color planes having the greatest density in comparison to each of the remaining said plurality of color planes.

25. The method of claim 24 wherein said first color plane is green.

26. The method of claim 25 wherein said plurality of color planes are in a Bayer pattern.

27. The method of claim 1 wherein said motion data is determined based upon, at least in part, determining first motion information based exclusively upon a first color plane of said plurality of color planes and second motion information based exclusively upon a second color planes of said plurality of color planes.

28. The method of claim 27 wherein said first motion information and said second motion information are compared against each other for consistency.

29. The method of claim 28 wherein said first motion information and said second motion information are combined to determine, at least in part, said motion data.

30. The method of claim 1 wherein said high resolution image is in a Bayer pattern where at least one of said plurality of color planes of said low resolution images is shifted with respect to at least one of the other of said plurality of color planes.

31. The method of claim 30 wherein said plurality of color planes is red, green, and blue.

32. The method of claim 31 wherein at least one of said red color plane and said blue color plane are shifted with respect to said green color plane, and said red colors and said blue colors are shifted with respect to each other.

33. The method of claim 1 wherein said motion data is calculated based upon at least a first metric and a second metric, where said first metric is different than said second metric, said first metric is used for a first color plane of said plurality of color planes, and said second metric is used for a second color plane of said plurality of color planes.

34. The method of claim 33 wherein said first color plane is green and said second color plane is at least one of blue and red.

35. The method of claim 34 wherein said second metric is defined by, If $x=\{x_1, \ldots 1x_N\}$ is an arbitrary N-dimensional vector then the $1_1$ norm of x is defined by $\|x\|_1 := \Sigma^N_{n=1}|x_n|$.

36. The method of claim 35 wherein said first metric is defined by, $\|x\|_\infty := \max\{|x_n|: n \in \{1, \ldots, N\}\}$.

37. An image processor that constructs a high resolution image from a plurality of low resolution images, each of said low resolution images includes a plurality of color planes, comprising:
   (a) said image processor receives said plurality of low resolution images, where said plurality of color planes of each of said low resolution images are spatially arranged in at least a partially non-coincident manner;
   (b) said image processor determines motion data representative of motion of at least a portion of said low resolution images; and
   (c) said image processor constructs said high resolution image, having a resolution greater than said low resolution images, based upon said spatially non-coincident color planes together with said motion data.

38. The image processor of claim 37 wherein said color planes of said low resolution images are completely non-coincident.

39. The image processor of claim 37 wherein said motion data is implicitly defined.

40. The image processor of claim 37 wherein said motion data is explicitly defined.

41. The image processor of claim 37 further comprising said image processor constructing a first set of images, where each of said first set of images is based upon a respective one of said low resolution images, and a plurality of said plurality of color planes is at least partially coincident within each of said first set of images.

42. The image processor of claim 41 wherein said motion data is determined based upon said first set of images.

43. The image processor of claim 42 further comprising said image processor determining said motion data based upon the luminance of said first set of images.

44. The image processor of claim 43 wherein said color planes of said first set of images is totally coincident.

45. The image processor of claim 44 wherein said first set of images include data representative of red, green, and blue.

46. The image processor of claim 37 wherein said plurality of low resolution images is obtained by a digital imaging device.

47. The image processor of claim 46 wherein said digital imaging device is at least one of a digital still camera, a digital video camera, and digital scanner.

48. The image processor of claim 38 wherein said low resolution images are in a Bayer pattern.

49. The image processor of claim 48 further comprising said image processor constructing a first set of images, where each of said first set of images is based upon a respective one of said low resolution images, and said plurality of color planes is coincident within each of said first set of images.

50. The image processor of claim 39 wherein said first set of images is on an orthogonal grid.

51. The image processor of claim 41 wherein said first set of images is the result of a CCDDSP algorithm.

52. The image processor of claim 37 further comprising said image processor sensing said plurality of low resolution images with a single charge coupled device.

53. The image processor of claim 37 wherein said motion data is predetermined.

54. The image processor of claim 37 wherein said high resolution image has a greater size than each of said low resolution images.

55. The image processor of claim 37 wherein said high resolution image has a smaller size than each of said low resolution images.

56. The image processor of claim 37 wherein said high resolution image has a size the same as each of said low resolution images.

57. The image processor of claim 37 wherein said high resolution image includes said plurality of color planes spatially arranged in at least a partially non-coincident manner.

58. The image processor of claim 57 wherein said image processor processes said high resolution image with a CCDDSP algorithm to construct a second image that has its color planes arranged in a coincident manner.

59. The image processor of claim 58 wherein said plurality of color planes is red, green, and blue.

60. The image processor of claim 37 wherein said motion data is determined based exclusively upon a first color plane of said plurality of color planes having the greatest density in comparison to each of the remaining said plurality of color planes.

61. The image processor of claim 60 wherein said first color plane is green.

62. The image processor of claim 61 wherein said plurality of color planes are in a Bayer pattern.

63. The image processor of claim 37 wherein said motion data is determined based upon, at least in part, determining first motion information based exclusively upon a first color plane of said plurality of color planes and second motion information based exclusively upon a second color plane of said plurality of color planes.

64. The image processor of claim 63 wherein said first motion information and said second motion information are compared against each other for consistency by said image processor.

65. The image processor of claim 64 wherein said first motion information and said second motion information are combined to determine, at least in part, said motion data by said image processor.

66. The image processor of claim 37 wherein said high resolution image is in a Bayer pattern where at least one of said plurality of color planes of said low resolution images is shifted with respect to at least one of the other of said plurality of color planes.

67. The image processor of claim 66 wherein said plurality of color planes is red, green, and blue.

68. The image processor of claim 67 wherein at least one of said red color plane and said blue color plane are shifted with respect to said green color plane, and said red color plane and said blue color plane are shifted with respect to each other.

69. The image processor of claim 37 wherein said motion data is calculated based upon at least a first metric and a second metric, where said first metric is different than said second metric, said first metric is used for a first color plane of said plurality of color planes, and said second metric is used for a second color plane of said plurality of color planes.

70. The image processor of claim 69 wherein said first color plane is green and said second color plane is at least one of blue and red.

71. The image processor of claim 70 wherein said second metric is defined by, If $x=\{x_1, \ldots, x_N\}$ is an arbitrary N-dimensional vector then the $1_1$ norm of x is defined by $\|x\|_1 := \Sigma^N_{n=1} |x_n|$.

72. The image processor of claim 71 wherein said first metric is defined by, $\|x\|_\infty := \max\{|x_n|: n \in \{1, \ldots, N\}\}$.

73. The method of claim 1 wherein said high resolution image is constructed using at least two types of filters.

74. The image processor of claim 37 wherein said high resolution image is constructed using at least two types of filters.

* * * * *